United States Patent
Fakhouri et al.

(10) Patent No.: US 9,866,433 B1
(45) Date of Patent: Jan. 9, 2018

(54) LIGHT-WEIGHT CLOUD APPLICATION PLATFORM

(71) Applicant: Pivotal Software, Inc., Palo Alto, CA (US)

(72) Inventors: Onsi Joe Fakhouri, San Francisco, CA (US); James Thomas Bayer, Palo Alto, CA (US); James Jacob Watters, San Francisco, CA (US)

(73) Assignee: Pivotal Software, Inc., San Francisco, CA (US)

( * ) Notice: Subject to any disclaimer, the term of this patent is extended or adjusted under 35 U.S.C. 154(b) by 240 days.

(21) Appl. No.: 14/949,728

(22) Filed: Nov. 23, 2015

(51) Int. Cl.
  *G06F 15/173* (2006.01)
  *H04L 12/24* (2006.01)
  *H04L 29/08* (2006.01)

(52) U.S. Cl.
  CPC .......... *H04L 41/0806* (2013.01); *H04L 67/10* (2013.01)

(58) Field of Classification Search
  CPC ........................... H04L 41/0806; H04L 67/10
  USPC ....................................................... 709/223
  See application file for complete search history.

(56) References Cited

U.S. PATENT DOCUMENTS 9,501,304 B1 * 11/2016 Powers .................. H04L 67/34

* cited by examiner

*Primary Examiner* — Wing F Chan
*Assistant Examiner* — Joseph Maniwang
(74) *Attorney, Agent, or Firm* — Fish & Richardson P.C.

(57) ABSTRACT

Methods, systems, and apparatus, including computer programs encoded on computer storage media, for deploying and using a light-weight cloud application platform. In one aspect, a method includes providing a deployment tool configured to deploy a light-weight cloud application platform in an execution environment in response to a user command that specifies the environment, and to create one or more instances of a cloud application executing on the light-weight cloud application platform in response to a user command that specifies a container image that includes the application. The deployment tool receives a first user command that specifies the execution environment. In response, the deployment tool deploys components of the light-weight cloud application platform, including a scheduling subsystem and a routing subsystem. The deployment tool receives a second user command that specifies a location of the container image. In response, instances of the cloud application are deployed without receiving further user commands.

20 Claims, 3 Drawing Sheets

LIGHT-WEIGHT CLOUD APPLICATION PLATFORM

BACKGROUND

This specification relates to cloud computing platforms.

A cloud computing platform is a system of physical computers and software that provides application developers and other consumers a service allowing them to deploy and run applications in a cloud computing system. This service makes it unnecessary for application developers to acquire, build, or maintain complex computing clusters. Rather, an application developer can provide an application and configuration information to the cloud computing platform, and the cloud computing platform can configure and run one or more instances of the application, as requested, in a cloud computing system. Cloud computing platforms may provide robust execution by actively monitoring and maintaining multiple instances of the application.

A cloud computing platform runs user developed applications in a particular underlying computing platform of the cloud computing system. An underlying computing platform is an environment in which a user developed application is executed. Different computing platforms can include different hardware, chipset architectures, operating systems, or virtual operating systems, to name just a few examples of the differences that underlying computing platforms may have.

Cloud computing platforms may also execute applications within isolated user spaces of virtual machines (VMs), the isolated user spaces being commonly referred to as software containers, or containers for short. Containers provide security and improve performance by isolating application instances from other applications and from other components of the underlying computing platform without incurring the overhead typically associated with launching a full virtual machine. A particular container implementation is another component of an underlying computing platform.

Cloud computing platforms often host web applications. A web application includes software that is downloaded and run by a web browser. Typically, the web browser acts primarily as a user interface for the web application while significant portions of processing for the web application occur on the cloud computing platform. Examples of applications that have been implemented as web applications include word processing applications, image editing applications, and email applications.

SUMMARY

This specification describes, among other things, a light-weight cloud application platform that includes expansive functionality, but that is easily deployable.

In general, one innovative aspect of the subject matter described in this specification can be embodied in methods that include the actions of providing a deployment tool configured to deploy a light-weight cloud application platform in an execution environment in response to a user command that specifies the execution environment, and to create one or more instances of a cloud application executing on the light-weight cloud application platform in response to a user command that specifies a container image that includes the cloud application; receiving, by the deployment tool, a first user command that specifies the execution environment; in response to receiving the first user command, deploying, by the deployment tool, components of the light-weight cloud application platform, including: a scheduling subsystem including: execution engines, each execution engine being installed on a particular computing instance of the execution environment; one or more executors, each executor being operable to receive a recipe including one or more platform independent, resource agnostic commands, each command corresponding to a requested service to be performed by one or the execution engines in the execution environment, and a routing subsystem that is operable to maintain a routing table for routing requests to individual instances of the cloud application; receiving, by the deployment tool, a second user command that specifies a location of the container image that includes the cloud application; in response to receiving the second user command, deploying instances of the cloud application without receiving further user commands, including: providing a request to the scheduling system to schedule execution of one or more instances of the cloud application, and providing a request to the routing subsystem to register the instances of the cloud application. Other embodiments of this aspect include corresponding systems, apparatus, and computer programs, configured to perform the actions of the methods, encoded on computer storage devices. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The routing subsystem can receive communication requests and route the communication requests to individual instances of the cloud application. Some aspects include receiving, by the routing subsystem of the deployed light-weight cloud application platform, a request to access the cloud application and routing, by the routing subsystem, the request to an individual instance of the cloud application.

The components of the light-weight cloud application platform can include a logging subsystem that is operable to attach to execution engines hosting one or more instances of the cloud application and stream log messages from the execution engines. Some aspects include receiving, by the deployment tool, a third user command that specifies a name of the cloud application and in response to receiving the third user command, providing a request to the logging subsystem to attach to the execution engines hosting one or more instances of the cloud application.

The execution environment can be a simulated cloud computing platform hosted by a single physical computing device. The execution environment can be a cloud computing platform hosted by a cloud computing service. Some aspects include identifying, by the deployment tool, user credentials for the cloud computing service in response to receiving the first user command and automatically using the user credentials to deploy the components of the light-weight cloud application platform in the cloud computing platform hosted by the cloud computing service without receiving further user commands from the user.

Particular embodiments of the subject matter described in this specification can be implemented so as to realize one or more of the following advantages. A light-weight cloud application platform allows users, e.g., novice users, to quickly and easily deploy a functional cloud application platform without having to understand or generate highly technical and burdensome user configurations. By only including certain functionality relative to enterprise-level cloud platforms, users can easily deploy and experiment with the functionality of highly scalable cloud application platforms. Installing and executing a fully functional cloud application platform on a client device allows users to easily execute applications in a cloud-like environment when data communication with a network is not available or limited.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A light-weight cloud application platform can manage the execution of applications and other workloads or tasks in an execution environment. The execution environment can include a cloud computing platform hosted by a cloud computing service or a simulated cloud computing platform hosted by a single physical computing device, e.g., a user's computer. The light-weight cloud application platform can include certain components that allow the platform to be deployed and executed on client devices quickly and with little required user involvement. For example, the light-weight cloud application can include a scheduling subsystem that manages execution engines for performing various commands for a cloud application, a routing subsystem that routes requests to individual instances of a cloud application, and a logging subsystem that outputs log messages from the execution engines. This combination of components provide expansive cloud computing functionality in a light-weight platform that requires little user configuration and fewer computing resources than some more complex enterprise-level cloud computing platforms.

Figure 1:
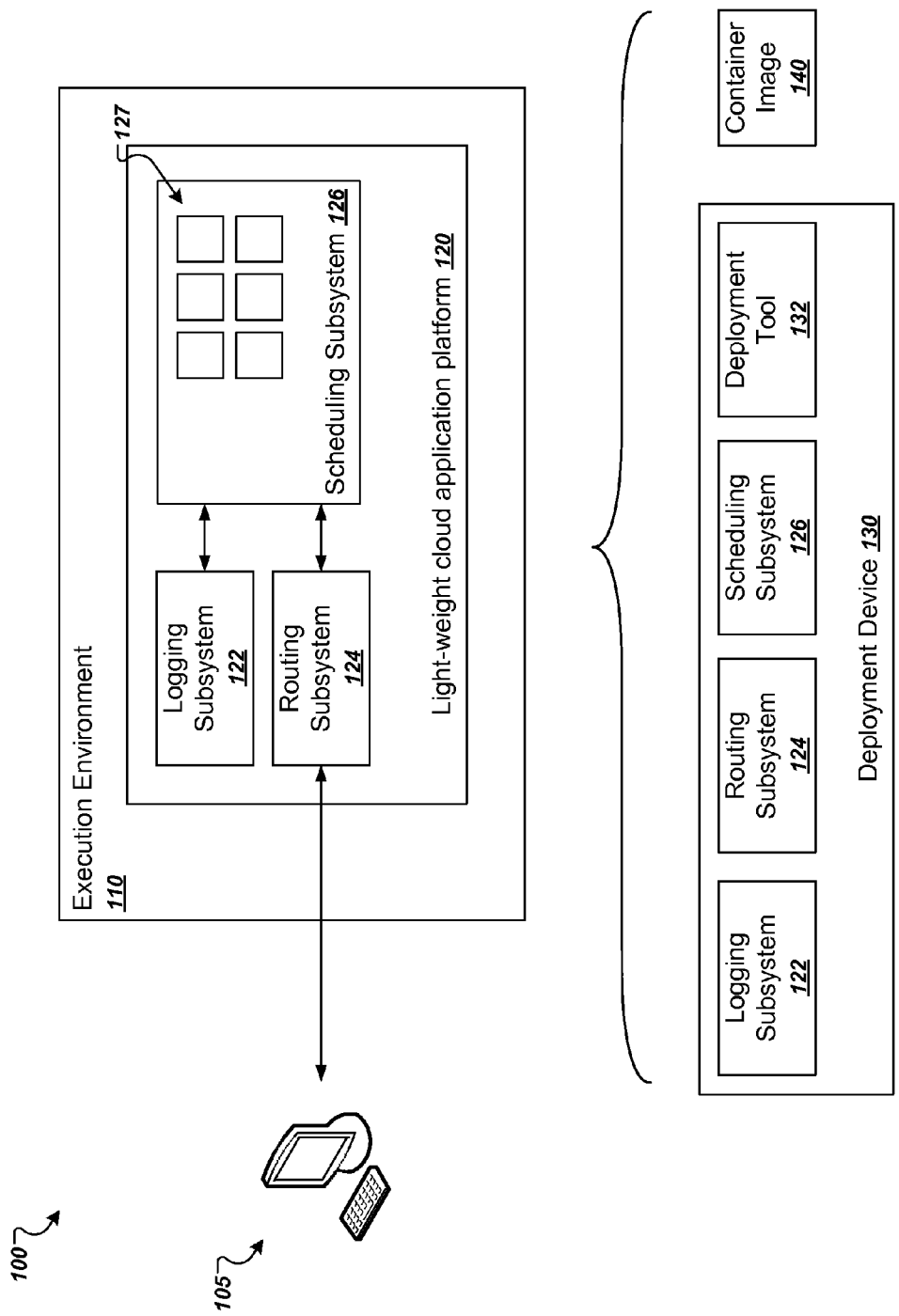
FIG. 1 is a diagram of an example system.

FIG. 1 is a diagram of an example system 100. The system 100 includes a user device 105 that hosts and/or interacts with an execution environment 110. For example, the user device 105 may be a desktop computer, a laptop computer, a tablet computer, a smartphone, or another appropriate type of computing device. The system 100 also includes a deployment device 130. The deployment device 130 can be the same computing device as the user device 105 or a different computing device that is in data communication with the user device 105, e.g., by way of a data communication network.

The deployment device 130 includes a logging subsystem 122, a routing subsystem 124, a scheduling subsystem 126, and a deployment tool 132. The deployment tool 132, which may be a software application, can deploy a light-weight cloud application platform 120 in an execution environment 110. As described in more detail below, the light-weight cloud application platform 120 can manage the execution of applications and other workloads or tasks in the execution environment 110. The deployment tool 132 can deploy the logging subsystem 122, the routing subsystem 124, and the scheduling subsystem 126 in the deployed light-weight cloud application platform 120.

The execution environment 110 can be a cloud computing platform hosted by a cloud computing service or a simulated cloud computing platform hosted by a single physical computing device, e.g., by the user device 105. For example, the cloud computing service may include one or more servers in data communication with the deployment device 130 and/or the user device 105 over a data communication network. The one or more servers of the cloud computing service can host the light-weight cloud application platform 120 while the light-weight cloud application platform 120 manages the execution of applications, workloads, and/or other tasks. Or, the user device 105 can host the light-weight cloud application platform 120 while the light-weight cloud application platform 120 manages the execution of applications, workloads, and/or other tasks.

A user can select to which execution environment to deploy components of the light-weight cloud application platform 120. As described in more detail below, the components of the light-weight cloud application platform 120 include a logging subsystem 122, a routing subsystem 124, and a scheduling subsystem 126. In one example, the user may select to deploy the components of the light-weight cloud application platform 120 at the user device 105 if data communication with a network is unavailable or limited. In another example, the user may select to deploy the components of the light-weight cloud application platform 120 in a cloud computing platform if the data processing demands of an application are better handled by servers.

The deployment tool 132 can deploy the components of the light-weight cloud application platform 120 in the appropriate execution environment based on a user command that specifies the execution environment. For example, a user may access the deployment tool 132 and request the initiation of a light-weight cloud application platform 120. In response, the deployment tool 132 can prompt the user to select between a cloud computing platform hosted by a cloud computing service or a simulated cloud computing platform hosted by the user device 105. The deployment tool 132 can then deploy the components of the light-weight cloud application platform 120 in the selected execution environment.

Some cloud computing services require user credentials, e.g., user name and/or password, for executing the cloud application. The deployment tool 132 can maintain user credentials for one or more users. If the user selects a cloud computing service as the execution environment 110, the deployment tool 132 an identify the user credentials for the cloud computing service and automatically deploy the components of the light-weight cloud application platform 120 in the cloud computing platform hosted by the cloud computing service without receiving additional user commands from the user, e.g., without receiving the user credentials from the user.

The deployment tool 132 can also deploy one or more instances of a cloud application in the deployed light-weight cloud application platform 120. The cloud application can be stored in a container image 140. The container image 140 can include the cloud application and components that support the cloud application. The container image 140 may also include an ordered collection of root file system changes and corresponding execution parameters for use within a container.

The deployment tool 132 can deploy the one or more instances of the cloud application within containers 127 in the light-weight application platform 120. The deployment tool 132 can deploy the instances of the cloud application in response to a user command. For example, the user can use the deployment tool 132 to deploy the light-weight cloud application platform 120 and identify, to the deployment tool 132, the location of the container image 140 that includes the cloud application. In response, the deployment tool 132 can deploy the light-weight cloud application platform 120 and deploy one or more instances of the cloud application within containers 127 in the deployed light-weight cloud application platform 120. For example, each instance of the cloud application may execute in its own container.

In some implementations, the deployment tool 132 deploys the components of light-weight cloud application platform 120 and the instance(s) of the container image 140 in the light-weight application platform 120 based on a user command that specifies the execution environment 110 (e.g., at the user device 105 or at a cloud computing platform) and the location of the container image 140, without additional user commands or configurations. In this way, deploying a cloud application platform and containers within the platform is intuitive for users and requires little set up time.

The deployment tool 132 can include a user interface for receiving commands from users. For example, the deployment tool 132 may include a command line interface (CLI) for receiving user commands. The CLI can receive various user commands that specify various data such as the execution environment 110, the location of a container image 140, and/or the name of a cloud application for which to view log messages. As described in more detail below, the CLI allows users to quickly and easily manage the execution of a cloud application and view data regarding the execution of the cloud application using short text commands.

The deployed light-weight application platform 120 includes a logging subsystem 122, a routing subsystem 124, and a scheduling subsystem 126. The scheduling subsystem 126 manages execution engines for performing various commands for a cloud application. In some implementations, the scheduling subsystem 126 processes units of work represented as recipes. A recipe is a sequence of platform independent, resource-agnostic commands. The recipes can be implemented as tasks or long-running processes. Tasks are represented by recipes whose commands a cloud application platform will perform as least once, e.g., download an application into a cloud environment for execution. Long-running processes are represented by recipes whose commands a cloud application platform will perform for an indefinite length of time and possibly in multiple instances, e.g., run multiple instances of an application in the cloud application platform.

Although not shown, the scheduling subsystem 126 can include a controller, a stager, an application manager, one or more executors, and/or one or more execution engines. An example scheduling subsystem that includes these components is described in U.S. patent application Ser. No. 14/601,970, titled "Cloud Computing Platform Architecture" and filed on Jan. 21, 2015, the entire contents of which are hereby incorporated herein by reference. Each of the components of the scheduling subsystem 126 can be installed on an underlying computing platform. An underlying computing platform can include a physical computing node and optionally one or more VMs installed on the physical computing node. An underlying computing platform represents a computing instance of the execution environment 110.

Each of the components of the scheduling subsystem 126 can be implemented as one or more software modules installed on one or more physical computers or on VMs installed on physical computers. For example, if the execution environment 110 is a simulated cloud computing platform hosted by a single physical computing device, e.g., the user device 105, each component of the scheduling subsystem 126 may be installed on the single physical computing device and/or VMs installed on the user device 105. If the execution environment 110 is a cloud computing platform hosted by a cloud computing service, the components may be distributed over multiple different cloud computing servers and/or VMs installed on the cloud computing servers.

Each underlying computing platform (e.g., the user device 105 or each cloud computing server) can include an execution engine that manages resources in the underlying computing platform. In some implementations, the execution engines are implemented as software modules in the underlying computing platforms.

The executors handle communication with the execution engines installed on the underlying computing platform(s). The executors can also be installed on the underlying computing platforms. In some implementations, each underlying computing platform can include an executor and an execution engine. In other implementations, some underlying computing platforms do not have an executor. If the execution environment 110 is a simulated cloud computing platform hosted by a single physical computing device, an executor and an execution engine may be installed on the single physical computing device.

The controller can receive an application, e.g., from the deployment tool 132. For example, the deployment tool 132 can provide a cloud application of the container image 140 to the controller as a part of deploying the one or more instances of the cloud application. The cloud application can be any appropriate application, e.g., a web application, a content server, or any other appropriate unit of computation. The cloud application can be written in any appropriate programming language, e.g., PHP, Java, Ruby, or Python, to name just a few examples, in multiple languages.

When initiating the light-weight cloud application platform 120, the user can specify parameters for running the cloud application, e.g., a number of instances, a desired underlying computing platform, a desired level of resource utilization, and values of one or more environment variables, to name just a few examples. Or, the user may specify these parameters and environment values in the container image 140. If the user does not specify such parameters, the scheduler subsystem 126 can use a default configuration for one or more parameters and environment values.

When the controller receives the application, the controller can make a request to the stager to stage the application. To stage the application, the scheduler subsystem 126 can import one or more build packs for compiling the application into an executable file on a target underlying computing platform.

The stager can use platform-independent, resource agnostic commands, to stage an application. Each platform-independent, resource-agnostic command corresponds to a requested service to be performed by an execution engine on an underlying computing platform. A command is platform-independent if the service corresponding to the command can be performed by an execution engine on any of a number of different underlying computing platforms. A command is resource-agnostic if an execution engine can perform a service corresponding to the command using any appropriate combination of resources of any single underlying computing platform.

Staging the application for execution in the light-weight cloud application platform 120 prepares the application for execution in one or more underlying computing platforms. Rather than staging the application itself, the stager can generate a single task recipe having platform-independent, resource-agnostic commands that request services to be performed by an execution engine staging the application in one or more underlying computing platforms. The platform-independent, resource-agnostic commands of the task recipe do not specify what resources will perform the staging operations. Rather, the execution engine(s) in each underlying computing platform can handle allocating resources, downloading the appropriate staging executable and build packs, and initiating staging operations using the allocated resources.

The stager can generate a task recipe to stage the application. For example, the task recipe can specify several platform-independent, resource-agnostic commands, e.g., download command(s), run command(s), and upload command(s). Each platform-independent, resource-agnostic command corresponds to a service to be performed by one or more execution engines in the execution environment 110. A download command requests that an object, identified by a resource location, be downloaded into an underlying computing platform. A run command requests that a particular executable file be executed in the underlying computing platform. An upload command requests that an object in an underlying computing platform be uploaded to a particular destination.

The stager can then provide the generated task recipe to an executor. In some implementations, the task recipe need not specify an underlying computing platform that should effectuate the commands of the task recipe, nor does the task recipe need to specify what resources are required to effectuate the commands of the task recipe. Instead, the executor translates each platform-independent, resource-agnostic command of the task recipe into one or more platform-independent, resource-specific requests that satisfy the service of the command. The executor can make each of the requests to execution engines of the execution environment 110.

A request is resource-specific if the request directs an execution engine to operate on a resource in an underlying computing platform. For example, requests can direct an execution engine to allocate a container in an underlying computing platform, download objects into the allocated container, and set limits on CPU, disk, and memory consumption for the allocated container. A request being platform-independent means that the same request can be provided to any one or more of multiple different underlying computing platforms.

Each platform-independent, resource-specific request corresponds to one or more platform-specific, resource-instance-specific operations to be performed by an execution engine on a particular underlying computing platform. Because the requests are platform-independent, the executor can make the same set of requests to execution engines on different underlying computing platforms.

The execution engines receive the requests and, in response perform platform-specific, resource-instances specific operations to satisfy the requests. For example, a platform-independent, resource-specific request might request allocation of a container of an underlying computing platform. In another example, the executor can make a request to each execution engine to copy a file into an allocated resource on the underlying computing platform(s). Each execution engine can receive the request and copy the file accordingly.

If the requests succeed, the executor(s) can provide an indication to the stager that the task recipe has succeeded. By operation of the upload command, the generated executable application will be stored in a particular location in a data storage subsystem for use by the application manager when launching instances of the application. The stager can then provide an indication to the controller that the commands of the task recipe have successfully been carried out and that the cloud application has been successfully staged.

The deployment tool 132 can send a request to the scheduling subsystem 126 to launch one or more instances of the cloud application. For example, the deployment tool 132 may receive a command, e.g., from a developer, that specifies the location of the container image 140. In response, the deployment tool 132 may access the container image 140 to identify the number of instances of the cloud application to launch. The deployment tool 132 can provide a request to the scheduling subsystem 126 to schedule the execution of the number of instances of the cloud application. The deployment tool 132 can also provide a request to the routing subsystem to register the number of instances of the cloud application. The controller of the scheduling subsystem 126 can receive the request from the deployment tool 132 and send the request to the application manager of the scheduling subsystem 126.

The application manager can receive the request and generate a long-running process (LRP) recipe for running one or more instances of the executable application in the execution environment 110. The LRP recipe represents a process that should be executed for an indefinite length of time. The LRP recipe can include download commands that request that the cloud application be downloaded into an underlying computing platform and that a database for user by the executable application be downloaded into the underlying computing platform. The LRP recipe can also include a run command that requests that the executable application be executed in the underlying computing platform and a log command that requests log messages be streamed to a particular destination. The application manager then provides the LRP recipe to the executor(s) along with indications of how many instances of the application the executor(s) should start.

Each executor receives the LRP recipe and translates the commands of the LRP recipe into a sequence of platform-independent, resource-specific requests for launching instances of the cloud application. The execution engine(s) can execute the platform-independent, resource-specific requests to launch the instances of the cloud application.

The routing subsystem 124 receives communication requests and routes the communication requests to individual instances of the cloud application. For example, the routing subsystem 124 can receive communication requests from users and route the communication requests to the appropriate instance(s) of the cloud application. The communication requests can include data for use by an instance of the cloud application. For example, the cloud application may be a web application that receives data from a user, processes the data, and output data or content based on the received data.

In some implementations, the routing subsystem 124 provides a user interface for receiving communication requests from users. For example, the user interface may be a web page for the cloud application. Each cloud application, or each instance of a cloud application, may have a dedicated web page for receiving communication requests from users.

In some implementations, the routing subsystem 124 maintains a routing table for routing communication requests to individual instances of the cloud application. The routing table may include data specifying an address of location of each instance of the cloud application. In some implementations, the scheduling subsystem 126 registers each instance of the application with the routing subsystem 124 when the instance is initiated. In some implementations, each instance of the cloud application registers with the routing subsystem 124 when the instance is initiated. In response, the routing subsystem 124 can create an entry in the routing table for the initiated instance of the cloud application.

The routing subsystem 124 can also balance traffic across instances of the cloud application. In some implementations, the routing subsystem 124 uses round-robin load balancing. In addition, the routing subsystem 124 may retry communication requests if a chosen instance of the cloud application does not accept a communication request.

The logging subsystem 122 outputs log messages related to each instance of a cloud application. The log messages can include various data regarding the execution of a cloud application, e.g., data describing user accesses of the cloud application, errors generated during execution, actions taken by the application, and so on. The log messages can include useful information for a developer that enables the developer to monitor the cloud application and/or debug the cloud application.

In some implementations, the logging subsystem 122 attaches to each execution engine that hosts one or more instances of a cloud application and streams log messages from the execution engine(s). The logging subsystem 122 can also aggregate log messages for multiple different instances of a cloud application and organize the log messages for presentation to a developer or other user.

The logging subsystem 122 can attach to the execution engine(s) that host one or more instances of a cloud application in response to a user command that specifies the name of the cloud application (or some other identified for the application). For example, a user that wants to view log messages for a particular cloud application may issue a user command to the deployment tool 132. This user command may specify the name of the cloud application. For example, the user may simply type the name of the cloud application into a CLI of the deployment engine 132. The deployment engine 132 can then provide a request to the logging subsystem 122 to attach to the execution engine(s) that host the instance(s) of the cloud application. Once attached, the logging subsystem 122 can receive log messages generated by the execution engine(s) and/or the instance(s) of the cloud application and output the log messages to the user. The logging subsystem 122 can also attach to other components of the execution environment 110 and stream log messages from the other components.

Figure 2:
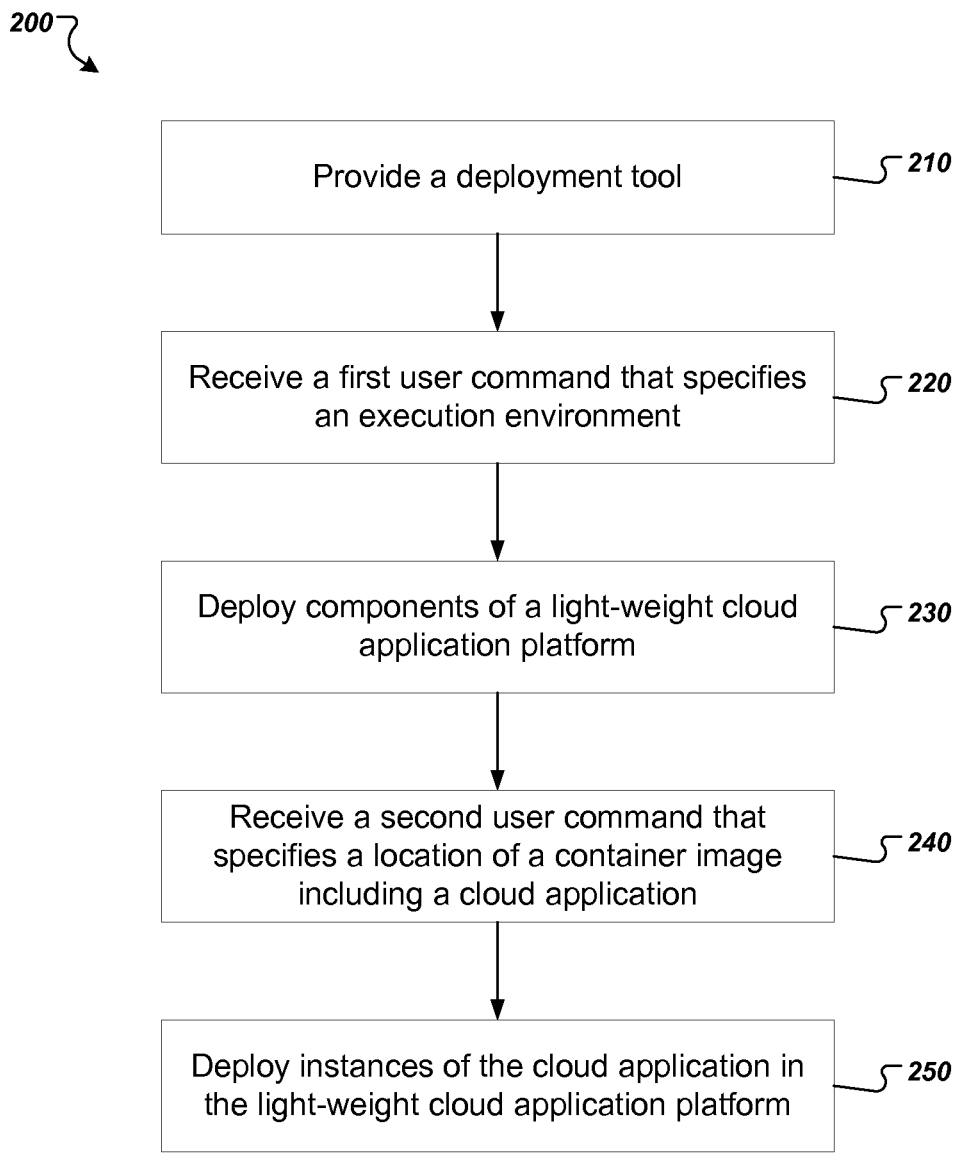
FIG. 2 is a flow chart of an example process for deploying a light-weight cloud application platform and instances of a container image in the light-weight cloud application platform.

FIG. 2 is a flow chart of an example process 200 for deploying a light-weight cloud application platform and instances of a container image in the light-weight cloud application platform. The process 200 can be implemented by one or more computer programs installed on one or more computers. The process will be described as being performed by an appropriately programmed system of one or more computers, e.g., the deployment device 130 of FIG. 1.

The system provides a deployment tool (210). The deployment tool may be implemented in software and/or hardware. The deployment tool may include a user interface, e.g., a CLI, for receiving user commands from a user.

The system receives a first user command (220). The first command may specify an execution environment for a cloud application. For example, the execution environment can be a cloud computing platform hosted by a cloud computing service or a simulated cloud computing platform hosted by a single physical computing device, e.g., by a user device. The first user command may be received from a CLI provided by the deployment tool. For example, a user may type the name of the execution environment or an address or locator for the execution environment into the CLI provided by the deployment tool. In a particular example, the user may type a text-based command and a URL for the execution environment into the CLI. In this example, the first user command may be in the form of "ltc target 192.168.11.11.xip.io", in which "ltc target" is a command to deploy a light-weight cloud application platform and "192.168.11.11.xip.io" is the address of the execution environment.

The system deploys components of a light-weight cloud application platform (230). The system may deploy the light-weight application platform in the execution environment specified by the first user command. For example, the system may initiate the light-weight cloud application platform in the execution environment and deploy a logging subsystem, a routing subsystem, and a scheduling subsystem in the execution environment.

In some implementations, the system deploys the components of the light-weight cloud application platform using a predefined installation tool based on the selected execution environment. The installation tools can create and configure development environments for cloud applications. For example, the system may use a first installation tool when the first user command specifies the simulated cloud computing platform. Similarly, the system may use a second installation tool different from the first installation tool when the first user command specifies the cloud computing platform. The first and second installation tools can include predefined configurations for initiating the light-weight cloud application platform on the appropriate execution environment. For example, the first installation tool may include predefined configurations for initiating the light-weight cloud application platform on a user device while the second installation tool may include predefined configurations for initiating the light-weight cloud application platform with a cloud computing service.

In a particular example, the first installation tool may be Vagrant, which is distributed by Hashicorp and the second installation tool may be Terraform, which is also distributed by Hashicorp. The system can download and install (if not previously installed) the appropriate installation tool based on the first user command. The system can then use the installation tool to deploy the light weight cloud application platform in the appropriate execution environment.

The system receives a second user command (240). The second user command may specify a location of a container image that includes a cloud application. For example, the user may enter the location of the container image, e.g., a URL for the container image, into the CLI. The container image may include a cloud application for execution in the light-weight cloud application platform. The container image may also include data specifying a number of instances of the cloud application to execute.

The second user command may also be a text-based command that includes the location of the container image. In this example, the second user command may be in the form of "ltc create lattice-app cloudfoundry/lattice-app," in which "ltc create lattice-app" is a command to deploy a particular cloud application and "cloudfoundry/lattice-app" is the location of the container image that includes the particular cloud application.

The system deploys one or more instances of the cloud application in the light-weight cloud application platform (250). For example, the system may send to a scheduler subsystem of the light-weight cloud application platform a request to deploy a number of instances of the cloud application as specified by the container image. In response, the scheduling subsystem may schedule the execution of the instance(s) by one or more execution engines of the execution environment.

While the instance(s) of the cloud application are executing, a user can submit additional commands, e.g., using the CLI, to manage the execution of the cloud application. An example user command can increase or decrease the number of instances of the cloud application that are executing. This example user command may be in the form of "ltc scale lattice-app 5," in which "ltc scale" is a command to adjust the number of instances of cloud application "lattice-app" that are executing in the light-weight cloud application platform to 5 instances. In response to receiving this example user command, the system may increase or decrease the number of actively executing instances of "lattice-app" to 5.

Another example user command can cause the system to stop executing the cloud application in the light-weight cloud application platform. This example user command may be in the form of "ltc remove lattice-app," in which "ltc remove" is a command to stop execution of cloud application "lattice-app." Other user commands allow the user to view a list of all of the user's running cloud applications, view the distribution of the cloud applications across the light-weight cloud application platform, or view detail status information for each running cloud application.

Figure 3:
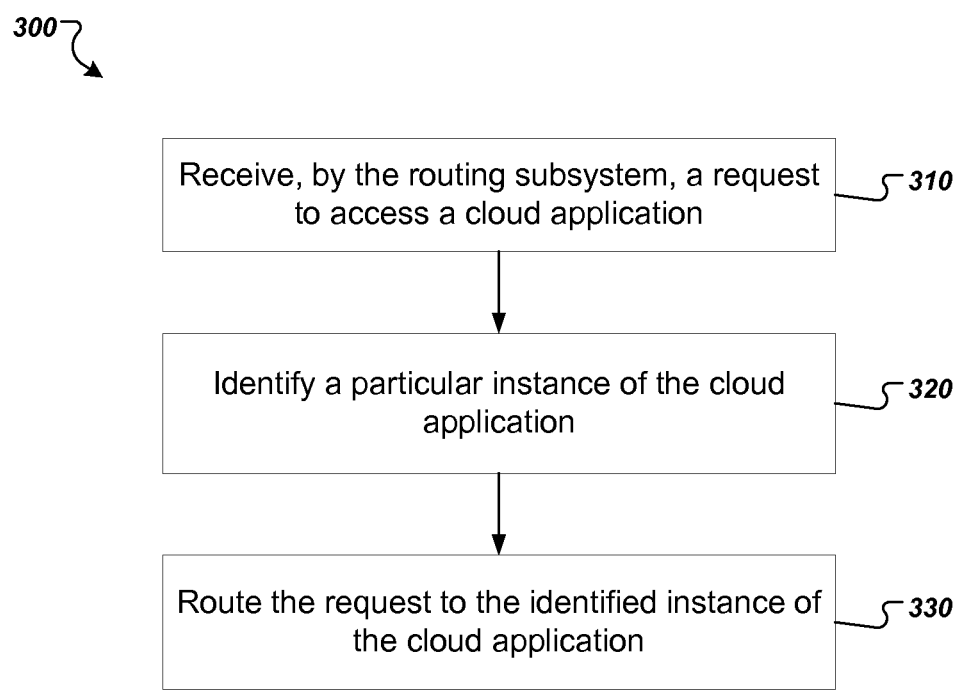
FIG. 3 is a flow chart of an example process for routing a request to access a cloud application.

FIG. 3 is a flow chart of an example process 300 for routing a request to access a cloud application. The process 200 can be implemented by one or more computer programs installed on one or more computers. The process will be described as being performed by an appropriately programmed system of one or more computers, e.g., the execution environment 110 of FIG. 1.

A routing subsystem of the system receives a request to access a cloud application (310). For example, a user may request to access the cloud application, e.g., using a user interface provided by the routing subsystem.

The routing subsystem identifies a particular instance of the cloud application (320). In some implementations, the routing subsystem identifies the particular instance of the cloud application using a load balancing technique, e.g., round-robin load balancing.

The routing subsystem routes the request to the identified instance of the cloud application (330). In some implementations, the routing subsystem uses a routing table to route the request to the identified instance of the cloud computing application. For example, the routing subsystem may use the routing table to identify the location or address of the identified instance of the cloud application.

The request may be to view log messages generated by the cloud application. For example, as a cloud application is executing, the cloud application may generate log messages based on the execution. As described above, these log messages can include various data regarding the execution of a cloud application, e.g., data describing user accesses of the cloud application, errors generated during execution, actions taken by the application, and so on.

In some implementations, a log message request may be a user command in the form of "ltc logs lattice-app." In this example, "ltc logs" is a command to view log messages of application "lattice-app." A logging subsystem of the system can receive a request to view log messages, e.g., from the routing subsystem, and attach to one or more instances of the cloud application in response to the request. As the instance(s) of the cloud application generate log messages, the logging subsystem can output the log messages to the user. For example, the logging subsystem may stream the log messages to the CLI for presentation to the user.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   providing a deployment tool configured to deploy a light-weight cloud application platform in an execution environment in response to a user command that specifies the execution environment, and to create one or more instances of a cloud application executing on the light-weight cloud application platform in response to a user command that specifies a container image that includes the cloud application;
receiving, by the deployment tool, a first user command that specifies the execution environment;
in response to receiving the first user command, deploying, by the deployment tool, a plurality of components of the light-weight cloud application platform, including:
   a scheduling subsystem comprising:
      a plurality of execution engines, each execution engine being installed on a particular computing instance of the execution environment;
      one or more executors, each executor being operable to receive a recipe comprising one or more platform independent, resource agnostic commands, each command corresponding to a requested service to be performed by one or the execution engines in the execution environment, and
      a routing subsystem that is operable to maintain a routing table for routing requests to individual instances of the cloud application;
receiving, by the deployment tool, a second user command that specifies a location of the container image that includes the cloud application;
in response to receiving the second user command, deploying a plurality of instances of the cloud application without receiving further user commands, including:
   providing a request to the scheduling system to schedule execution of one or more instances of the cloud application, and
   providing a request to the routing subsystem to register the plurality of instances of the cloud application.

2. The method of claim 1, wherein the routing subsystem receives communication requests and routes the communication requests to individual instances of the cloud application.

3. The method of claim 2, further comprising:
receiving, by the routing subsystem of the deployed light-weight cloud application platform, a request to access the cloud application; and
routing, by the routing subsystem, the request to an individual instance of the cloud application.

4. The method of claim 1, wherein the plurality of components of the light-weight cloud application platform comprises:
a logging subsystem that is operable to attach to execution engines hosting one or more instances of the cloud application and stream log messages from the execution engines.

5. The method of claim 4, further comprising:
receiving, by the deployment tool, a third user command that specifies a name of the cloud application;
in response to receiving the third user command, providing a request to the logging subsystem to attach to the execution engines hosting one or more instances of the cloud application.

6. The method of claim 1, wherein the execution environment is a simulated cloud computing platform hosted by a single physical computing device.

7. The method of claim 1, wherein the execution environment is a cloud computing platform hosted by a cloud computing service.

8. The method of claim 7, further comprising:
in response to receiving the first user command, identifying, by the deployment tool, user credentials for the cloud computing service; and
automatically using the user credentials to deploy the components of the light-weight cloud application platform in the cloud computing platform hosted by the cloud computing service without receiving further user commands from the user.

9. A system, comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
providing a deployment tool configured to deploy a light-weight cloud application platform in an execution environment in response to a user command that specifies the execution environment, and to create one or more instances of a cloud application executing on the light-weight cloud application platform in response to a user command that specifies a container image that includes the cloud application;
receiving, by the deployment tool, a first user command that specifies the execution environment;
in response to receiving the first user command, deploying, by the deployment tool, a plurality of components of the light-weight cloud application platform, including:
   a scheduling subsystem comprising:
      a plurality of execution engines, each execution engine being installed on a particular computing instance of the execution environment;
      one or more executors, each executor being operable to receive a recipe comprising one or more platform independent, resource agnostic commands, each command corresponding to a requested service to be performed by one or the execution engines in the execution environment, and
      a routing subsystem that is operable to maintain a routing table for routing requests to individual instances of the cloud application;
receiving, by the deployment tool, a second user command that specifies a location of the container image that includes the cloud application;
in response to receiving the second user command, deploying a plurality of instances of the cloud application without receiving further user commands, including:
   providing a request to the scheduling system to schedule execution of one or more instances of the cloud application, and
   providing a request to the routing subsystem to register the plurality of instances of the cloud application.

10. The system of claim 9, wherein the routing subsystem receives communication requests and routes the communication requests to individual instances of the cloud application.

11. The system of claim 10, wherein the operations further comprise:
receiving, by the routing subsystem of the deployed light-weight cloud application platform, a request to access the cloud application; and routing, by the routing subsystem, the request to an individual instance of the cloud application.

12. The system of claim 9, wherein the plurality of components of the light-weight cloud application platform comprises:
a logging subsystem that is operable to attach to execution engines hosting one or more instances of the cloud application and stream log messages from the execution engines.

13. The system of claim 12, wherein the operations further comprise:
receiving, by the deployment tool, a third user command that specifies a name of the cloud application;
in response to receiving the third user command, providing a request to the logging subsystem to attach to the execution engines hosting one or more instances of the cloud application.

14. The system of claim 9, wherein the execution environment is a simulated cloud computing platform hosted by a single physical computing device.

15. The system of claim 9, wherein the execution environment is a cloud computing platform hosted by a cloud computing service.

16. The system of claim 15, wherein the operations further comprise:
in response to receiving the first user command, identifying, by the deployment tool, user credentials for the cloud computing service; and
automatically using the user credentials to deploy the components of the light-weight cloud application platform in the cloud computing platform hosted by the cloud computing service without receiving further user commands from the user.

17. A computer program product, encoded on one or more non-transitory computer storage media, comprising instructions that when executed by one or more computers cause the one or more computers to perform operations comprising:
providing a deployment tool configured to deploy a light-weight cloud application platform in an execution environment in response to a user command that specifies the execution environment, and to create one or more instances of a cloud application executing on the light-weight cloud application platform in response to a user command that specifies a container image that includes the cloud application;
receiving, by the deployment tool, a first user command that specifies the execution environment;
in response to receiving the first user command, deploying, by the deployment tool, a plurality of components of the light-weight cloud application platform, including:
a scheduling subsystem comprising:
a plurality of execution engines, each execution engine being installed on a particular computing instance of the execution environment;
one or more executors, each executor being operable to receive a recipe comprising one or more platform independent, resource agnostic commands, each command corresponding to a requested service to be performed by one or the execution engines in the execution environment, and
a routing subsystem that is operable to maintain a routing table for routing requests to individual instances of the cloud application;
receiving, by the deployment tool, a second user command that specifies a location of the container image that includes the cloud application;
in response to receiving the second user command, deploying a plurality of instances of the cloud application without receiving further user commands, including:
providing a request to the scheduling system to schedule execution of one or more instances of the cloud application, and
providing a request to the routing subsystem to register the plurality of instances of the cloud application.

18. The computer program product of claim 17, wherein the routing subsystem receives communication requests and routes the communication requests to individual instances of the cloud application.

19. The computer program product of claim 18, wherein the operations further comprise:
receiving, by the routing subsystem of the deployed light-weight cloud application platform, a request to access the cloud application; and
routing, by the routing subsystem, the request to an individual instance of the cloud application.

20. The computer program product of claim 17, wherein the plurality of components of the light-weight cloud application platform comprises:
a logging subsystem that is operable to attach to execution engines hosting one or more instances of the cloud application and stream log messages from the execution engines.

* * * * *